Fig. 1

INVENTOR
JAMES R. MEININGER
BY
Harry O. Ernsberger
ATTORNEY

INVENTOR
JAMES R. MEININGER
BY
Harry O. Ernsberger
ATTORNEY

INVENTOR
JAMES R. MEININGER

BY
Harry O Ernsberger
ATTORNEY

United States Patent Office 3,472,211
Patented Oct. 14, 1969

3,472,211
FUEL FEED SYSTEM AND CHARGE FORMING APPARATUS
James R. Meininger, Fond du Lac, Wis., assignor to The Tillotson Manufacturing Company, Toledo, Ohio, a corporation of Ohio
Filed Feb. 13, 1967, Ser. No. 615,838
Int. Cl. F02b 33/04
U.S. Cl. 123—73                                2 Claims

ABSTRACT OF THE DISCLOSURE

The disclosure embraces a charge forming apparatus and fuel feed system wherein fuel for engine idling purposes is delivered to the crankcase compartments of a multicylinder two cycle engine for engine idling purposes, the engine idling fuel being delivered to the engine independently of the mixing passage of the charge forming apparatus and independently of the fuel and air mixture delivered to the engine for normal and high speed operation.

---

This invention relates to fuel feed system and charge forming apparatus for an internal combustion engine and more especially to a fuel feed system and charge forming apparatus for use with multicylinder engines of the two cycle type, the system particularly embracing fuel delivery and control for engine idling purposes.

Engines of the two cycle or two stroke type having two or more cylinders have been used but difficulties have been encountered in obtaining satisfactory idling operation of such multicylinder engines. It is a usual practice in providing fuel for engine idling to deliver the fuel from a fuel chamber in the carburetor into the carburetor mixing passage with the throttle in slightly opened position, the suction or aspiration on the downstream side of the throttle causing fuel to be delivered through an orifice into the mixing passage for mixing with the air moving past the nearly closed throttle. Under such conditions the air velocity moving through the engine intake manifold is so low that the liquid fuel particles are not maintained in suspension and tend to collect on the walls or floor of the manifold.

The collected fuel tends to form in puddles and such condition results in impaired idling operation of the engine. The puddles of wet fuel in the manifold are sporadically admitted as slugs of fuel into the engine cylinders causing the engine to stall because of an overrich mixture lacking sufficient air to provide a combustible mixture. During the period that the wet fuel is collecting in the manifold, the engine cylinders receive an insufficient amount of fuel to maintain engine idling operation and the engine stalls. The magnitude of these difficulties varies with the ambient temperature conditions and operating temperatures of the engine. The difficulties of providing for satisfactory engine idling operation are encountered in the use of both float-type charge forming devices or carburetors and aspirated diaphragm type carburetors especially with multicylinder two cycle engines where it is necessary in engine operation that the fuel mixture be alternately diverted from one engine crankcase compartment to the other.

The invention embraces a charge forming apparatus, system and arrangement wherein the fuel for engine idling purposes is delivered to the crankcase compartments of a multicylinder two cycle engine from the charge forming apparatus or carburetor independently of the mixing passage of the charge forming apparatus or carburetor.

Another object of the invention embraces a fuel feed system wherein liquid fuel for engine idling purposes is delivered into an intake manifold or directly into the engine crankcase compartments of a multicylinder two cycle engine for engine idling purposes independently of the fuel and air mixture delivered to the engine for normal engine operation.

Another object of the invention resides in a fuel feed system for a multicylinder two cycle internal combustion engine wherein fuel for engine idling purposes is delivered to the crankcase of each of the cylinders or to a manifold through independent conveying tubes or passages minimizing the tendency for wet fuel to collect in the manifold or engine crankcase whereby improved engine idling operation is attained.

Another object of the invention resides in a fuel feed system for a multicylinder two cycle internal combustion engine, the system including a carburetor having a mixing passage utilized for forming combustible fuel and air mixture for normal and high speed operation and wherein the fuel for engine idling purposes is delivered from a carburetor fuel chamber to each crankcase compartment of the engine through tubular means individual to each crankcase compartment whereby a substantially uniform delivery of fuel for engine idling purposes is assured.

Another object of the invention resides in a fuel feed system for a multicylinder two cycle internal combustion engine wherein the fuel from the carburetor for engine idling purposes is delivered through tubular means individual to each crankcase compartment, the system including valve means effective to assure the delivery of liquid fuel during the proper cycling periods into the engine crankcase compartments from a single carburetor or charge forming apparatus.

Another object of the invention is the provision of a fuel feed system for a two cylinder two cycle internal combustion engine wherein the fuel for engine idling purposes is delivered from the carburetor fuel chamber to the engine crankcase compartments through tubes or passages individual to each crankcase compartment, the system being usable with a float bowl carburetor or an aspirated diaphragm type carburetor.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 15 is a fragmentary sectional view illustrating a check valve in a different location in the engine idling fuel delivery system of the invention;

Figure 1:
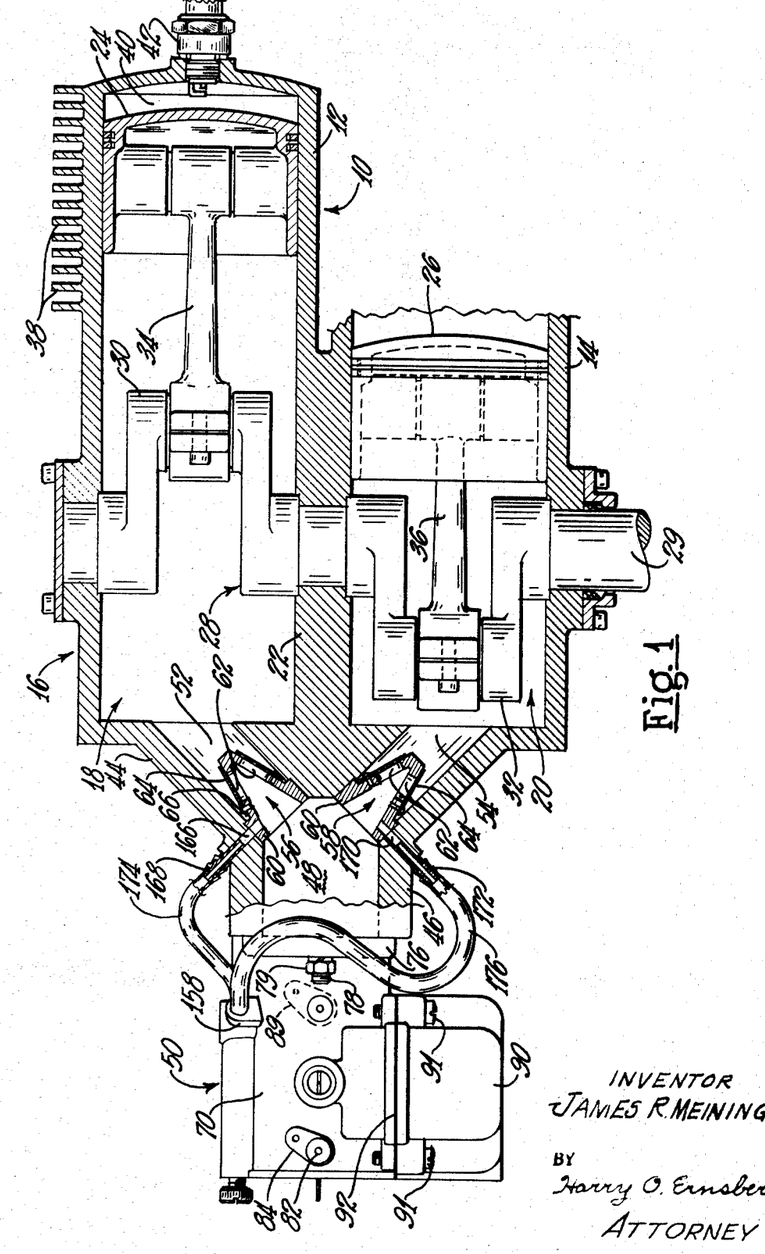
FIGURE 1 is a longitudinal sectional view of a two cylinder, two cycle internal combustion engine illustrating a carburetor or charge forming apparatus of the float-controlled type and the system of the invention for delivering fuel for engine idling purposes.

Referring to the drawings in detail and initially to FIGURE 1 there is illustrated a semischematic longitudinal sectional view of a two cylinder, two cycle engine of the horizontal reciprocating piston type in association with a charge forming apparatus or carburetor wherein the fuel for engine idling purposes is conveyed to a region for delivery into the crankcase compartments of the engine independently of the mixture conveying manifold and the mixing passage of the carburetor.

The engine 10 is of the two cylinder type embodying cylinders 12 and 14 which are connected or integrated with an engine crankcase 16, the crankcase being divided into two crankcase chambers or compartments 18 and 20 by a central wall or partition 22. Reciprocably disposed in the respective cylinders are pistons 24 and 26 of identical construction. Journaled in bearings in the crankcase 16 is a crankshaft 28, the crankshaft having a crank arm 30 in the crankcase chamber 18 and a second crank arm 32 in the second crankcase chamber 20.

The crank pin of the first crank arm 30 is connected with the wrist pin of the piston 24 by a conventional connecting rod 34, and the crank pin of the second crank arm 32 connected by a conventional connection rod 36 with the wrist pin of the piston 26. The crank arms 30 and 32 are spaced 180° apart to attain a substantially balanced condition of the moving components of the engine. The crankshaft 28 is provided with a portion 29 extending exteriorly of the crankcase housing for connection with an instrumentality or mechanism to be driven by the engine.

The engine cylinders 12 and 14 are provided with cooling fins 38 for transferring heat away from the engine. The space between each piston and cylinder head provides a combustion chamber 40 wherein mixture, delivered above the piston through conventional passage means (not shown), is ignited at each revolution of the crankshaft by a conventional spark plug 42. The engine crankcase 16 is provided with a manifold portion 44 and a manifold extension 46, the latter providing a manifold chamber 48 which receives combustible fuel and air mixture from a charge forming device or carburetor 50.

The portion 44 of the crankcase construction is fashioned with a first passage 52 opening into the crankcase chamber 18 and a second passage 54 which opens into the second crankcase chamber or compartment 20, the passages 52 and 54 being adapted to convey combustible fuel and air mixture from the manifold chamber 48 into the crankcase compartments. The mixtures in the compartment are compressed upon downward movements of the pistons and delivered through suitable conventional channel means (not shown) to the combustion chambers 40, one of which is shown in FIGURE 1.

Each of the passages 52 and 54 is provided with a one-way valve or check valve construction which accommodates flow of fuel and air mixture from the manifold 48 into the crankcase compartments but inhibits reverse flow of the mixture from the crankcase compartments or chambers 18 and 20.

In the embodiment illustrated in FIGURE 1, a one-way valve means 56 is disposed at the entrance of passage 52 and a similar or identical one-way valve means 58 disposed at the entrance of the passage 54. Each of the valve means 56 and 58 is inclusive of a fitting or member 60 having converging wall portions provided with openings or ports 62 which are normally closed by reed valves 64, an end region of each reed valve being secured to member 60 by a rivet 66.

The reeds 64 are of flexible or spring metal and are flexed to open positions under the influence of reduced pressure in crankcase compartments to admit fuel and air mixture from the manifold 48. As the pistons move in opposed phase relation, mixture from the manifold 48 is alternately delivered into the engine crankcase compartments 18 and 20 and the mixtures in the combustion chambers 40 ignited during each revolution of the crankshaft.

One form of charge forming device or carburetor 50 of the float-controlled type is illustrated in FIGURES 1 through 5. The carburetor includes a body portion 70 formed with a normally horizontally-disposed mixing passage 72 having an air inlet 73, a Venturi 74 and a mixture outlet region 75. The outlet end of the carburetor body 70 is fashioned with a mounting flange 76 having openings 77 accommodating studs 78 carried by the crankcase portion, the studs receiving nuts 79, one of which is shown in FIGURE 1, to securely mount the carburetor on the manifold portion 46.

Figures 2, 3, 4, 5, 5A:
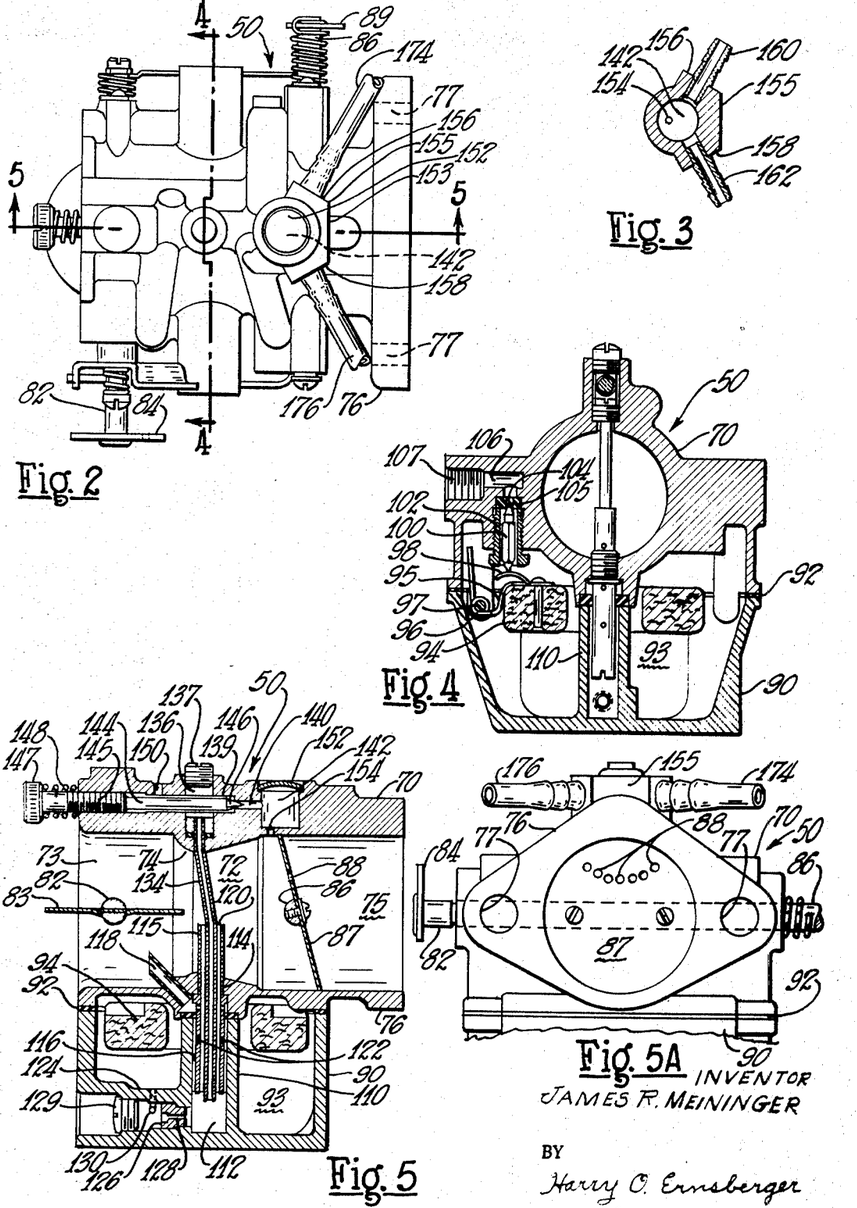
FIGURE 2 is a top plan view of a charge forming apparatus or carburetor illustrated in FIGURE 1.
FIGURE 3 is a detail sectional view of a component of the carburetor shown in FIGURE 2.
FIGURE 4 is a transverse sectional view through the carburetor, the view being taken substantially on the line 4—4 of FIGURE 2.
FIGURE 5 is a longitudinal sectional view through the carburetor, the view being taken substantially on the line 5—5 of FIGURE 2.
FIGURE 5A is a view of a portion of the construction shown in FIGURE 5.

Extending across the air inlet 73 of the mixing passage is a shaft 82 equipped with a disc-type choke valve 83 which is adapted to be moved to closed position for engine starting purposes. The shaft 82 is provided with an arm 84 for manipulating the choke valve. A shaft 86 extends across the mixture outlet region 75 and is equipped with a disc-type throttle valve 87, the shaft 86 having an arm 89 for manipulating the throttle valve 87.

The throttle valve 87 is fashioned with a plurality of comparatively small openings or passages 88 to provide for restricted air flow through the mixing passage when the throttle valve 87 is in tightly closed or engine idling position to provide the requisite amount of air for mixing with the air and fuel emulsion delivered in a manner hereinafter described for engine idling purposes. The small openings 88 may be arranged in any desired orientation but, as illustrated in FIGURE 5A, they are arranged in a curved pattern.

A hollow cup-like member or float bowl 90 is disposed beneath the body 70 and is secured thereto by screws 91, a sealing gasket 92 being disposed between the bowl 90 and the body 70. The bowl 90 provides a chamber 93 adapted to contain liquid hydrocarbon fuel. Means is provided for controlling flow of liquid fuel from a supply tank (not shown) to the fuel chamber 93. Disposed within the float bowl or fuel chamber 93 is an annularly-shaped float member 94 of cork or other suitable low density material. Secured to the float member 94 is an arm 95 provided with curled portions 96 embracing a pin 97, the pin forming a pivotal support for the float 94.

A portion 98 of the member 95 is engageable with one end of an inlet valve 100 of conventional construction slidably contained within a cage or fitting 102 securely threaded into a bore in the body 70. The valve 100 has conically-shaped valve portion 104 which cooperates with an annulr valve seat 105, the port in the valve seat 105 being in communication with a fuel inlet passage 106. The body 70 is fashioned with a threaded bore 107 adapted to accommodate a fitting (not shown) to which a fuel supply tube is connected in the conventional manner.

Liquid fuel may be supplied to the inlet of the carburetor from a fuel tank by gravity or the fuel inlet connected with the fuel pump (not shown) for supplying fuel under low pressure to the carburetor. Pivotal movement of the float 94 resulting from variations in the level of the fuel in the chamber 93 controls the inlet valve 104 to admit fuel into the chamber to maintain substantially constant the level of the fuel in the float bowl or chamber 93.

A central boss portion 110 of member 90 is fashioned with a fuel well 112 which registers with an opening 114 in the body 70, a thin walled tube 115 snugly fitting in the opening 114 extends downwardly into the well 112. The tube wall within the fuel well or bore in the central boss 110 is disposed to provide an annular space 116 which is in communication with an air bleed tube 118 extending into the air inlet region 73 for conveying air into the annular space 116 for mixing with the fuel delivered through the outlet 120 of the tube 115, the outlet 120 being the main orifice opening into the Venturi of the mixing passage.

The wall of the tube 115 is fashioned with openings 122 through which air in the annular space 116 is admitted to the fuel within the tube 115 so that an emulsion of fuel and air is delivered from the main orifice 120 into the mixing passage. Means is provided for metering or restricting flow of liquid fuel into the well 112 for delivering both through the main orifice and through the engine idling and low speed fuel delivery system hereinafter described.

As shown in FIGURES 4 and 5, a boss portion 124 formed integral with the float bowl 90 is bored to accommodate a metering fitting or member 126 provided with a restricted fuel flow passage 128 of a size to meter flow of liquid fuel from the fuel chamber 93 into the well 112. The bore in the boss 124 is closed at its outer end by a plug 129, and a passage 130 admits fuel from the fuel chamber 93 into the bore in the boss 124 between the member 126 and the plug 129.

The invention embraces the provision of an arrangement for delivering fuel for engine idling operation to the crankcase compartments independently of the mixing passage 72 of the carburetor. With reference particularly to FIGURES 4 and 5, a fuel conveying tube 134 extends downwardly through the tube 115 into the well 112. The exterior diameter of the tube 134 is substantially less than the interior diameter of the tube 115 to accommodate fuel flow from the well through tube 115 for delivery through the main orifice 120. Tube 134 extends across the mixing passage into a bore or chamber 136, the outer end of the bore being closed by a plug 137.

A bore 139 is provided in the body 70 above the mixing passage which is in communication with the bore 136 and a restricted passage 140, the latter opening into an auxiliary or supplemental chamber 142. The bore 139 accommodates a valve body 144 having a threaded portion 145 cooperating with a threaded portion of the bore for adjusting the position of the valve body 144. The valve body 144 is fashioned with a needle valve portion 146 which cooperates with the restriction or restricted passage 140 to regulate or control fuel flow through the passage 140 into the auxiliary chamber 142.

The valve body 144 is provided with a knurled head 147 for manually adjusting the needle valve 146, a coil spring 148 being disposed between the knurled head 147 and the carburetor body 70 for establishing friction to retain the valve body 144 in adjusted position. An air bleed opening or air vent 150 in communication with the bore 139 admits atmospheric air into the fuel delivered through the tube 134 into the chamber 136 to provide an emulsion of fuel and air moving past the needle valve 146.

A Welsh plug 152 closes the outer end of the auxiliary chamber 142. In the wall of the mixing passage adjacent the throttle end at the upstream side of the throttle is a passage or orifice 154 which provides a fuel delivery orifice for low engine speed operation. The orifice 154 does not deliver fuel until the throttle valve 87 is moved away from closed position (shown in FIGURE 5).

When the throttle is closed under engine idling operation, the orifice 154 admits air from the mixing passage into the supplemental chamber 142 for mixing with the fuel and air emulsion in the chamber 142 for engine idling purposes.

The throttle valve 87 in the arrangement illustrated is adapted to be in tightly closed position during engine idling operations as the engine idling fuel is delivered to the crankcase independently of the mixing passage 72. The carburetor body 70 at a region adjacent the chamber 142 is fashioned with boss 155 having angularly projecting portions 156 and 158, the portion 156 being drilled to accommodate a tubular fitting or nipple 160 in communication with the chamber 142, and the portion 158 drilled to accommodate a second tubular fitting or nipple 162 in communication with the chmber 142.

With reference to FIGURE 1, the portion 44 of the crankcase 16 is provided with a bore 166 which accomdates a tubular fitting or nipple 168, the bore extending through a portion of the reed valve support 60 as shown in FIGURE 1. A second bore 170 extends through portion 44 and through the second reed valve support 60 disposed in the passage 54, the bore 170 accommodating a tubular fitting or nipple 172. The nipples 160 and 168 are connected by a tube 174 which may be of copper or flexible material such as synthetic rubber or other suitable material resistant to deterioration by hydrocarbon fuels. The tubular fittings or nipples 162 and 172 are connected by a similar tube 176 of copper, synthetic rubber or other suitable material.

From the foregoing it will be apparent that fuel and air emulsion from the auxiliary chamber 142 is delivered through nipples 160 and 168, tube 174 and passage 166 for delivery for engine idling purposes past the reed valves 64 through passage 52 and into the crankcase compartment 18. Through this arrangement fuel for engine idling purposes is delivered by individual fuel delivery means to the region 56 from which it enters into the crankcase compartment 18 under the reduced pressure or suction set up in the compartment 18 upon movement of the piston 24 to its extreme right-hand position as viewed in FIGURE 1.

During a phase of operation of the engine 180° from the above-mentioned entry of fuel for engine idling into the crankcase 18 opposite piston 26 initiates its movement in a right-hand direction, as viewed in FIGURE 1, setting up reduced pressure or suction in the crankcase compartment 20 thereby effecting fuel flow from the auxiliary chamber 142 in the carburetor through nipples 162 and 172, tube 176 and passage 170 and past the reed valves 64 through passage 54 into the crankcase compartment 20 for ultimate delivery through conventional channel means into the combustion chamber above the piston 26.

In engine idling position, the throttle valve 87 is tightly closed and in such position there is no fuel delivered through the mixture outlet 75 into the manifold chamber 48 but a small amount of air flows through the passages 88 for the engine idling mixture.

In engine idling position, the fuel and air emulsion is delivered individually and alternately through the tubes 174 and 176 to the regions of the respective reed valves so that each engine crankcase compartment and combustion chamber receives an individual uniform charge of fuel from the auxiliary chamber 142.

The engine aspiration is effective in the fuel in the well 112 to elevate engine idling fuel through the tube 134 into chamber 136, the fuel being there mixed with air through air bleed 150, and the emulsion aspirated through the restriction 140 into the auxiliary chamber 142 where additional air is admitted to the emulsion from the mixing passage 72 through the low speed orifice 154. With this arrangement, each charge of fuel and air emulsion is aspirated to a region where it is delivered into a crankcase compartment when the adjacent reed valves are open and independently of fuel from the mixing passage 72 of the carburetor and manifold 48 so that a uniform charge of fuel and air is provided for each cylinder at each revolution of the engine for engine idling.

There is no liability of puddling of fuel in the carburetor mixing passage or manifold and there is a minimum of wetting of the walls of the crankcase compartments as each charge of fuel and air emulsion is readily mixed with air aspirated through the orifices 88 in the throttle 87. This provides for smooth engine idling performance as the velocity of the air and fuel delivered through the tubes 174 and 176 and air through the throttle orifices 88 is sufficiently high as to keep the fuel droplets or particles in suspension and thus prevent puddling of fuel in the crankcase compartments.

Figure 6:
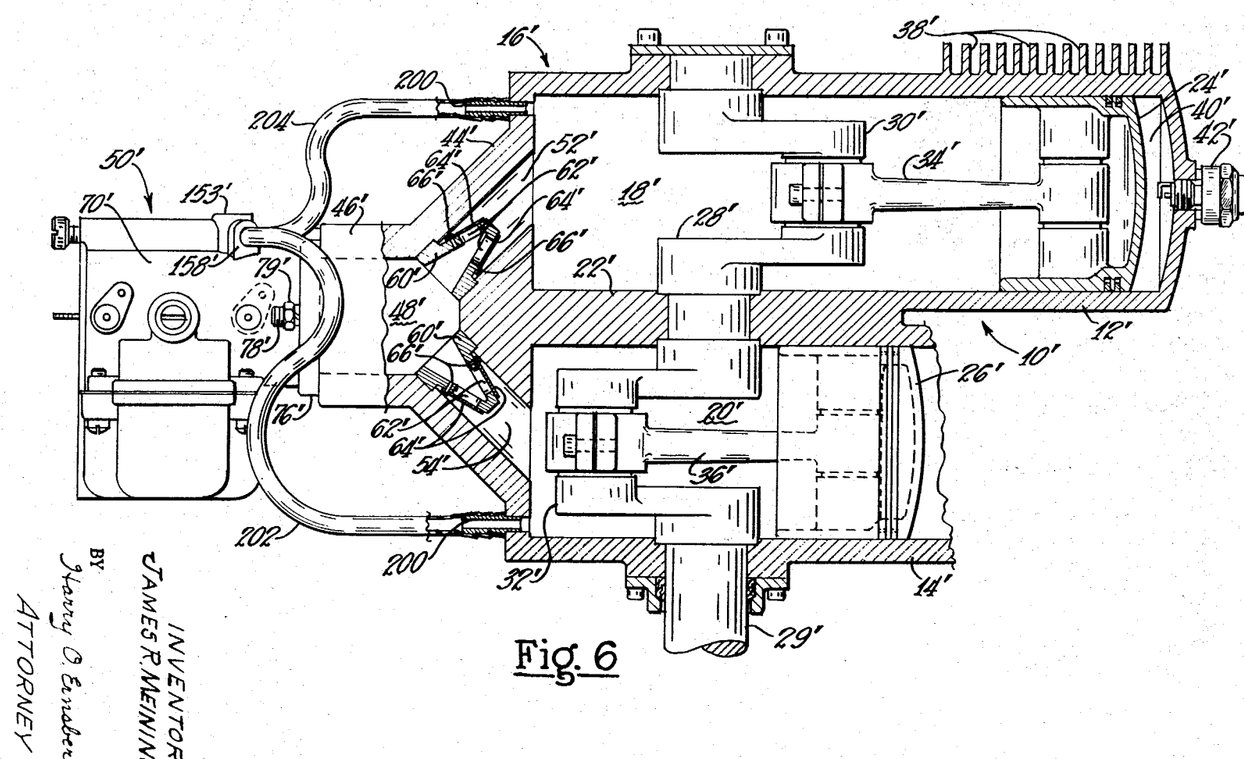
FIGURE 6 is a longitudinal sectional view of an engine in association with a carburetor construction similar to FIGURE 1 illustrating a modification of the arrangement or system for delivering fuel for engine idling purposes into the crankcase compartments of a multicylinder two cycle engine.
Figure 7:
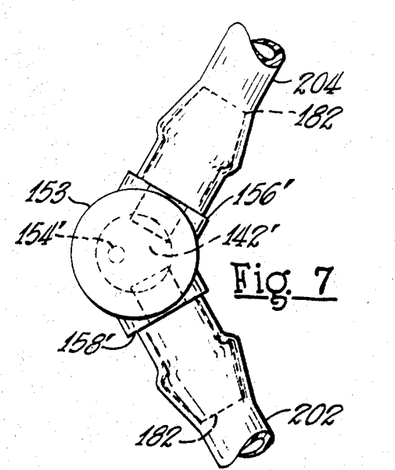
FIGURE 7 is a fragmentary plan view illustrating a dual fuel delivery arrangement for engine idling purposes.
Figures 8, 9, 10, 11, 12, 13, 14:
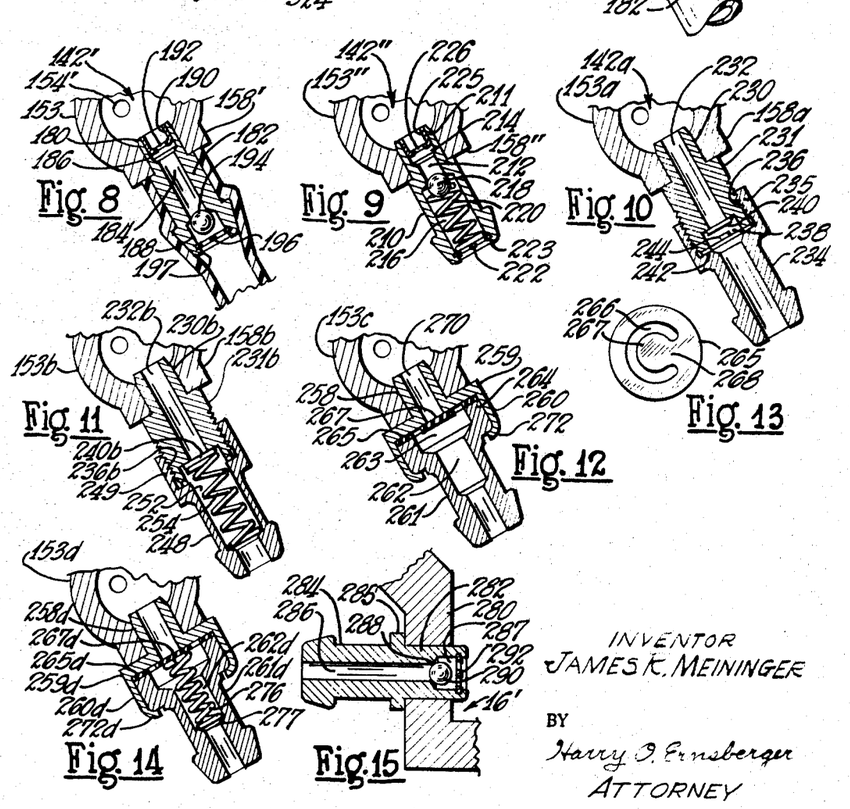
FIGURE 8 illustrates a check valve arrangement for the idling fuel delivery system.
FIGURE 9 is a detail sectional view illustrating another form of check valve arrangement for the engine idling fuel conveying system.
FIGURE 10 is a detail sectional view illustrating another form of check valve arrangement for the engine idling fuel delivery system.
FIGURE 11 is a detail sectional view showing another form of check valve for the engine idling fuel delivery system.
FIGURE 12 is a sectional view illustrating a check valve of the flap type.
FIGURE 13 is a plan view of the flap valve illustrated in FIGURE 12.
FIGURE 14 is a view similar to FIGURE 12 illustrating a spring-biased flap valve.

FIGURES 6, 7 and 8 illustrate a modified arrangement for delivering fuel or an emulsion of fuel and air directly into the crankcase compartments of a two cylinder, two cycle engine independently of the fuel and air mixture delivered to the engine for normal operation. The two cylinder, two cycle engine illustrated in FIGURE 6 is similar to the engine shown in FIGURE 1, and the charge forming apparatus or carburetor illustrated in FIGURE 6 is of the same character as shown in FIGURES 1 through 5A. The engine 10' of FIGURE 6 includes cylinders 12' and 14' integral with a crankcase 16' partitioned by a central wall 22' providing independent chambers or compartments 18' and 20'.

Reciprocably disposed in the respective cylinders are pistons 24' and 26'. A crankshaft 28' journaled in the crankcase has a crank arm 30' in chamber 18' and a second crank arm 32' in the chamber 20'. The crank arm 30' is connected with the wrist pin of the piston 24' by a connecting rod 34' in a conventional manner. The crankshaft arm 32' is connected with the wrist pin of the piston 26' by a connecting rod 36'. The crank arms 30' and 32' are spaced 180° apart to provide a substantially balanced condition.

The crankshaft 28' has a portion 29' exteriorly of the crankcase for connection with mechanism to be driven. The cylinders 12' and 14' are fashioned with cooling fins 38' for transferring heat away from the engine.

The combustion chamber 40' of each cylinder receives fuel and air mixture compressed in the engine crankcase through conventional channel means (not shown) during each revolution of the crankshaft, the mixture being ignited by conventional spark plugs 42', one being illustrated.

The crankcase 16' has a manifold portion 44' and a manifold extension 46', the latter providing a manifold chamber 48' receiving combustible fuel and air mixture for normal engine operation from a charge forming device or carburetor 50' of the character shown in FIGURES 1 through 5A. The portion 44' of the crankcase has a first passage 52' opening into the chamber 18' and a second passage 54' opening into the chamber 20'. Each of passages 52' and 54' is provided with a one-way valve or check valve construction which permits flow of fuel and air mixture from the manifold chamber 48' into the crankcase chambers but inhibits reverse flow of the mixture.

The check valve constructions in each of the passages 52' and 54' are identical. Each check valve is inclusive of a fitting or cage 60' having converging walls provided with ports 62' normally closed by flexible reed valves 64', and end of each reed valve being secured by a rivet 66'. The reeds are of spring metal for flexing to open positions by reduced pressures or suction in the crankcase compartments to admit fuel and air mixture from the manifold 48'.

As the pistons move in opposed phase relation, combustible mixture from the manifold 48' is alternately delivered into the crankcase compartments 18' and 20', the mixture compressed in the crankcase compartments and delivered through conventional channel means (not shown) to the combustion chambers 40' in which a charge is ignited at each revolution of the engine crankshaft. The carburetor 50' includes a mounting flange 76' on the carburetor body 70' secured to the manifold extension 46' by threaded studs 78' and securing nuts 79'.

The main fuel and air mixture for normal and high speed engine operation is delivered from the mixing passage 72 of the carburetor as hereinbefore described. The body 70' has a projecting portion 153' fashioned with bosses 156' and 158' preferably angularly disposed as shown in FIGURE 7. Each of bosses 156' and 158' is fashioned with a bore adapted to receive a tenon 180, one of which is shown in FIGURE 8, formed on a nipple or fitting 182, the fittings 182 being of identical construction. Each fitting 182 has a passage 184 in communication with a counterbore 186 at the tenon end of the fitting and in communication with a counterbore 188 in the opposite end region.

A cup-like metal member 190, pressed into the counterbore 186, has an opening 192 for metering flow of fuel and air mixture for engine idling purposes. Loosely disposed in the counterbore 188 is a check valve in the form of a ball or spherical member 194 preferably of resinous material, such as nylon, but may be made of metal.

A resinous material, such as nylon, is preferred to provide a check valve of a minimum weight to promote its responsiveness to differential pressures to open and close with each rotation of the engine crankshaft. An open mesh retainer 196 for the ball valve is secured in the end region of the counterbore 186 by swaging 197.

The retainer 196 is spaced from the ball 194 sufficiently to accommodate opening and closing movements thereof. The tenon end of the fitting 180 opens into the supplemental chamber 142' which receives fuel and air mixture or emulsion through the tube 134 and communicating passageways in the carburetor, as shown in FIGURE 5. With reference to FIGURE 6, a nipple or tubular fitting 200 extends into an opening in the crankcase wall of each of the compartments 18' and 20'. The nipple 200 opening into the crank case 20' is connected with one of the nipples or fittings 182 by a flexible tube 202 and the other nipple 200 connected by a flexible tube 204 with the other fitting or nipple 182.

It is to be understood that the check valve nipples 182 may be used in place of the plain nipples 200, and the plain nipples 200 employed at the position occupied by the nipples 182 shown in FIGURE 7, connected with the boss 153' on the carburetor.

In the arrangement illustrated in FIGURE 6, embodying the check valve or one-way valve construction illustrated in FIGURE 8, engine idling operation is as follows: With the throttle valve 87 of the carburetor, illustrated in FIGURES 5 and 5A, in fully closed position, suction or reduced pressure is established in compartment 20' when the engine piston 26' moves in a right-hand direction as viewed in FIGURE 6.

The reduced pressure opens the reed valves 64' and the reduced pressure communicated through the tube 202 past the open check valve 194 (see FIGURE 8), through passage 184 and supplemental chamber 142' to aspirate or lift fuel from the fuel well 112, shown in FIGURE 5, through tube 134 and past the needle valve 146.

The suction is effective to admit air to the fuel through a vent 150 (shown in FIGURE 5) and additional air through the low speed orifice 154 providing an emulsion delivered through the tube 202 into the crankcase compartment 20'. Simultaneously the suction or reduced pressure is effective in the manifold chamber 48' connected with the mixture outlet passage 75, shown in FIGURE 5, to effect restricted air flow through the small openings 88 in the throttle valve 87 thus providing the requisite amount of air to establish in the engine crankcase compartment 20' a combustible fuel and air mixture.

Upon movement of the piston 26' into the crankcase compartment 20', pressure is developed in the compartment closing the valve reeds 64' and closing the ball check valve 194, shown in FIGURE 8, whereby the pressurized mixture for engine idling is delivered through conventional channel means (not shown) to the combustion chamber above the piston 26' and is ignited by the spark plug. During this cycle of operations in reference to the movement of the piston 26', the piston 24' is moving 180° out of phase with the piston 26' and the same series of method steps or operations occur successively with respect to the crankcase compartment 18'.

Thus, when the piston 24' reaches its extreme right-hand position, as viewed in FIGURE 6, suction or reduced pressure in the compartment 18' opens the other set of reed valves 64', the suction being communicated through the tube 204 and the passage in the other fitting 182, the ball valve 194 in the fitting being in open position whereby fuel is aspirated from the well 112 in the carburetor into the supplemental chamber 142', and the emulsion of fuel and air in the supplemental chamber 142' delivered through tube 204 into the engine crankcase compartment 18' and there mixed with air admitted through the openings 88 in the throttle valve 87 to provide a proper fuel and air ratio in the compartment 18'.

When engine speed is slightly increased in response to a small opening of the throttle valve 87, aspiration of air velocity through the mixing passage is effective on the low speed orifice 154, shown in FIGURE 5, to divert the emulsion in chamber 142 through the orifice 154 into the mixing passage where the emulsion is mixed with air and flows into the crankcase compartments for low speed engine operation, it being understood that some emulsion from the chamber 142 may continue to flow through the idle tubes into the crankcase compartments.

As the throttle valve 87 is further moved toward open position, the aspiration in the mixing passage 72 is increased and initiates delivery of fuel from the well 112 through the main orifice 120 into the mixing passage and therein mixed with air moving at high velocity, the mixture flowing through the manifold chamber 48' past the reed valves 64' into the crankcase compartments thence into the cylinders for normal or high speed engine operation.

Through the arrangement shown in FIGURE 6, the emulsion of fuel and air is alternately delivered through the tubes 202 and 204 to provide, with the air moving through the restricted openings 88 in the throttle valve 87, a uniform charge for each cylinder during engine idling operation.

There is no puddling of fuel because the emulsion of fuel and air moving through each of the tubes 202 and 204 is delivered in equal charges into each cylinder without encountering any overrich or lean mixture conditions as the flow of emulsion is substantially constant and the flow of air through the passages 88 in the throttle valve 87 substantially constant when the throttle valve 87 is in fully closed position. These conditions assure smooth and even idling operation of the engine.

The valves in the idling system in the form shown in FIGURE 6 are essential to successful operation of the engine not only at idling speed but also at intermediate and high engine speeds. At low engine speeds, the valves are necessary to prevent a reverse pressure pulse from the crankcase in one tube adversely affecting delivery of emulsion of fuel through the other tube to the other crankcase compartment.

At normal or high engine speeds, the check valves 194 are essential to prevent pressure developed in one crankcase compartment being communicated to the other crankcase compartment in which suction or aspiration is existent.

If the ball valves 194 do not substantially function in synchronism with the pressure and suction pulses developed at all engine speeds, a crossover of pressure from one crankcase compartment through the idling tube system to the other compartment occur and impair engine operation.

Furthermore, if the check valves are not closed tightly during pressure pulses in the tubes 202 and 204, vapor or gas in the engine crankcase will flow past a check valve in a reverse direction and through the fuel delivery tube 134 into the well 112 in the carburetor causing bubbles in the fuel which impairs delivery of fuel through the main orifice 120 into the mixing passage. It is thus desirable that the check valves or check balls 194 be of light weight material, such as nylon, so that the ball valves will be alternately opened and closed during each revolution of the engine, the usual engine speed being upwards of six thousand or more revolutions per minute.

FIGURE 9 illustrates a modified arrangement of check valve for inclusion in a fitting between the idling fuel passage system of the carburetor and an engine crankcase compartment. In this form a tubular nipple or fitting 210 has a tenon portion 211 pressed into a bore in the boss 158" on the member 153". The nipple 210 is fashioned with a central bore or passage 212 opening into a counterbore 214 at one end, the other end of the passage 212 opening into a counterbore 216. Disposed in the counterbore or passage 216 is a ball check valve 218 which seats against a ledge defined by the entrance of the passage 212 into the counterbore 216.

An expansive coil spring 220 urges the ball to closed position, the opposite end of the spring being buttressed against a retainer 222 held in the end of the nipple 210 by swaging 223. A cup-shaped member 225 pressed into the counterbore 214 is provided with an opening 226 for metering the fuel and air emulsion delivered through the nipple and an adjacent flexible tube to an engine crankcase compartment. The maximum amount or flow rate of fuel and air mixture for engine idling purposes may be varied by changing the size of the metering opening 226 in the cup-like member 225, or by replacing the cup member 225 with an opening of different size.

The expansive pressure of the spring 220 is an assist in securing rapid response of the valve 218 to engine aspiration and pulse pressure. Another function attributable to spring pressure is that crankcase pressure is usually high at normal and high engine speeds and it is imperative that the ball valve 218 be urged to closed position in order to prevent transmission of pressure into the idle fuel passage system of the carburetor.

The pressure of the spring 220 should be sufficient to close the check valve and prevent opening at high engine speeds where engine crankcase pressures are reduced but insufficient to prevent the ball valve 218 from being opened by high engine aspiration in a crankcase compartment to admit air and fuel emulsion for engine idling. It is to be understood that a second fitting and valve arrangement as shown at 210 is provided for the fuel conveying tube leading from the supplemental chamber 142" in boss 153" of the carburetor to the other crankcase compartment.

FIGURE 10 illustrates a modified form of check valve for use in an arrangement for delivering fuel and air emulsion to a crankcase compartment for engine idling.

The projection 158a of the boss portion 153a is bored to accommodates a tenon 230 of a fitting 231 fashioned with a bore or passage 232. A tubular member or nipple 234 is fashioned with a threaded sleeve portion 235 adapted for engagement with a threaded portion 236 of the fitting 231. The threaded end of fitting 231 is fashioned with a counterbore 238 in which is loosely disposed a disc valve 240.

The disc valve 240 is of lesser diameter than the counterbore 238 to facilitate flow of a fuel and air emulsion from chamber 142a past the valve when the latter is moved from its seat provided by the ledge formed at the juncture of passage 232 with the counterbore 238. A suitable gasket 242, which may be of copper or other suitable material, is fashioned with a central bar or raised portion 244 which limits the opening movement of the valve. The peripheral region of the gasket 242 is engaged between the end of the fitting 231 and a ledge on the nipple 234.

When the nipple 234 is drawn into threaded engagement with the fitting 231, the gasket 242 provides a seal between the fitting 231 and the nipple 234. The nipple 234 is connected by a flexible tube, such as the tube 202 shown in FIGURE 6, with a crankcase compartment 20', and a similar valve and fitting construction is arranged between the boss portion 153a and the tube, such as tube 204, in communication with the engine crankcase compartment 18'.

In the form of invention of FIGURE 10, the disc valve 240 may be made of nylon or other comparatively light material so as to facilitate rapid opening and closing of the valve at each revolution of the engine.

FIGURE 11 illustrates a modified arrangement of the construction shown in FIGURE 10. In this form the fitting 231b has a tenon 230b extending into a bore in projecting portion 158b of the boss 153b on the carburetor body. A tubular nipple 248 is fashioned with a threaded sleeve 249 which is engaged with a threaded portion 236b of fitting 231b. A disc valve 240b normally closes the passage 232b in the fitting 231b. The passage 252 in the nipple 248 is of a diameter to accommodate an expansive coil spring 254 which normally biases the valve 240b toward closed position. The spring 254 exerts sufficient bias to normally hold the valve 240b in closed position, the spring being compressed by differential pressure on the valve disc 204b when engine aspiration is set up in the crankcase compartment and tube such as tube 202 connected with the nipple 248. The force of the spring 254 fosters rapid closing of the valve 240b after the valve has been opened thereby facilitating high speed movements of the valve 240b. A similar valve construction is connected between the carburetor and the other crankcase compartment.

FIGURES 12 and 13 illustrate another form of check valve construction for an idling system for a two cylinder, two cycle engine. The portion 153c of the carburetor is fashioned with a bore snugly receiving a tenon 258 of a member 259 having a sleeve portion 260.

A tubular fitting 261 is fashioned with a passage 262 opening into a counterbore 263 defined by an annular portion 264 of the fitting 261. Disposed between a portion of the fitting 259 and the annular portion 264 is the peripheral region of a combined flap valve and gasket 265, the latter being shown in FIGURE 13.

The member 265 is of flexible synthetic rubber or the like and is fashioned with a curved open region 266 defining a flap valve 267 connected by a bridge or connecting region 268 with the peripheral region of the gasket 265. The flap valve 267, as shown in FIGURE 12, normally engages a flat portion of the fitting 259 functioning as a valve seat adjacent a passage 270 in the fitting 259. The peripheral region of the gasket 265 provides a sealing means between the nipple 261 and the fitting 259, and the flap portion 267 provides a flap type check valve for opening and closing the passage 270.

In assembly, the portion 272 of the fitting 259 is swaged over a shoulder portion of the nipple to secure the fitting 259 in assembly with the nipple 261. The nipple 261 is connected with a crankcase compartment 20' by means such as a tube 202, shown in FIGURE 6, and a similar valve construction is associated with the carburetor portion 153c and is connected to the other crankcase compartment through a tube, such as the tube 204 shown in FIGURE 6.

In the form of the invention shown in FIGURES 12 and 13, the flap valve 267 through its hinge connection 268 with the peripheral gasket portion provides a resilient flexible flap which readily responds to differential pressures set up by engine aspiration to be opened and closed rapidly for controlling the delivery of fuel and air emulsion into a crankcase compartment for engine idling operation.

FIGURE 14 illustrates a modification of the arrangement shown in FIGURE 12. In this form the boss portion 153d is provided with a bore to receive a tenon 258d of the fitting 259d. A nipple construction 261d, of the same construction as shown in FIGURE 12, is secured to the fitting 259 by swaging the sleeve 260d as at 272d. A member 265d of the same construction as member 265 is fashioned with a flexible flap valve portion 267d of the same character as shown in FIGURE 13, the flap valve seating against a planar surface of the fitting 259d in the same manner as shown in FIGURE 12.

Disposed in the bore 262d of the nipple 261d is an expansive coil spring 276, one end of which engages a ledge 277 at the base of the bore 262d, the other end of the spring engaging the flap valve 267d and normally biasing the flap valve toward its seat or closed position. In this arrangement, the pressure of the spring 276 assists in attaining rapid closing movement of the flap valve 267d. The nipple 261d is connected with an engine crankcase compartment by a flexible tube such as tube 202 shown in in FIGURE 6. A second construction identical with FIGURE 14 is contained in a second bore in the boss 153d and is connected by a flexible tube with the other crankcase compartment.

FIGURE 15 illustrates a modification wherein the check valve construction is embodied in a fitting or nipple supported in a wall of the engine crankcase compartment, the arrangement shown in FIGURE 15 being employed in lieu of the nipples 200 shown in FIGURE 6. With reference to FIGURE 15, a wall portion 280 of an engine crankcase compartment such as that shown at 18' in FIGURE 6, is provided with a bore to snugly receive a tenon 282 formed on a nipple or tubular fitting 284, a shoulder 285 on the nipple defining an innermost position of the tenon 282 in the crankcase compartment wall.

The nipple 284 is fashioned with a central passage 286 terminating in a counterbore 287 providing a ledge 288. Loosely disposed in the counterbore 287 is a check valve in the form of a ball 290 adapted to seat upon the ledge 288 for closing the passage 286 upon development of pressure in the adjacent crankcase compartment. A suitable grid-like retainer 292 is secured in the end region of the counterbore to prevent dislodgment of the check valve 290.

Where a check valve construction such as shown in FIGURE 15 is employed, a flexible tube, such as tube 202, shown in FIGURE 6, is connected with a plain nipple of conventional construction without a check valve secured in a bore in the boss 153' on the carburetor shown in FIGURE 6. An identical nipple construction, such as shown in FIGURE 15, is employed with the other crankcase compartment and is connected with a conventional unvalved nipple on the boss 153'. The ball check valves 290 in the nipples 284 prevent transmission to the carburetor of compression pressures developed in the engine crankcase compartments.

Figure 16:
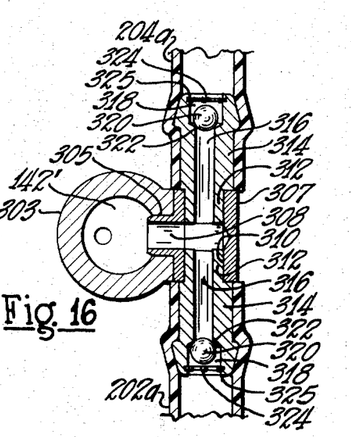
FIGURE 16 is a sectional view illustrating another form of check valve construction.

FIGURE 16 is a sectional view illustrating a modified form of siamese or dual connection with the carburetor of valved passageways for conveying fuel for engine idling purposes alternately to dual crankcase compartments. In this form the boss 303 which is similar to the boss 153 is fashioned with a single bore accommodating a tenon 305 of a member or fitting 307, the tenon 305 being pressed into the bore in the boss. The tenon is fashioned with a passage 308. The member 307 is fashioned with a bore 310 extending normal to the passage 308 and through the member 307.

The bore 310 snugly receives tenon portions 312 formed on an end of each of the nipples or tubular fittings 314, the tenons 312 being pressed into the bore 310 and the nipples being arranged in opposed relation. Each of the nipples 314 has a central passage 316 opening into a counterbore 318. Disposed in each counterbore 318 is a ball check valve 320, the ball valves being adapted to seat upon ledges 322 at the junction of passages 316 with the counterbores 318. Each check valve or ball 320 is loosely disposed in the counterbore to facilitate passage of fuel past the valve when the valve is spaced from its seat 322.

Each check ball 320 is prevented from dislodgment by a perforated retainer 324 secured in the outer end of a nipple by swaging 325. One of the nipples is connected by a flexible tube 202a with one engine crankcase compartment such as compartment 20', shown in FIGURE 6, and the other nipple 314 connected by a flexible tube 204a with the other crankcase compartment such as the compartment 18', shown in FIGURE 6.

In this form of construction, both nipples equipped with check valves are connected with a common fitting 307 having a passage 308 in communication with the chamber 142' formed in the boss 303 on the carburetor. The construction shown in FIGURE 16 functions in the manner of the other forms of construction as the ball valves 320 are adapted for movement to facilitate fuel flow for engine idling from chamber 142' to either crankcase compartment and to prevent reverse flow of fuel upon the establishment of increased pressures of compression in the crankcase compartments.

Figure 17:
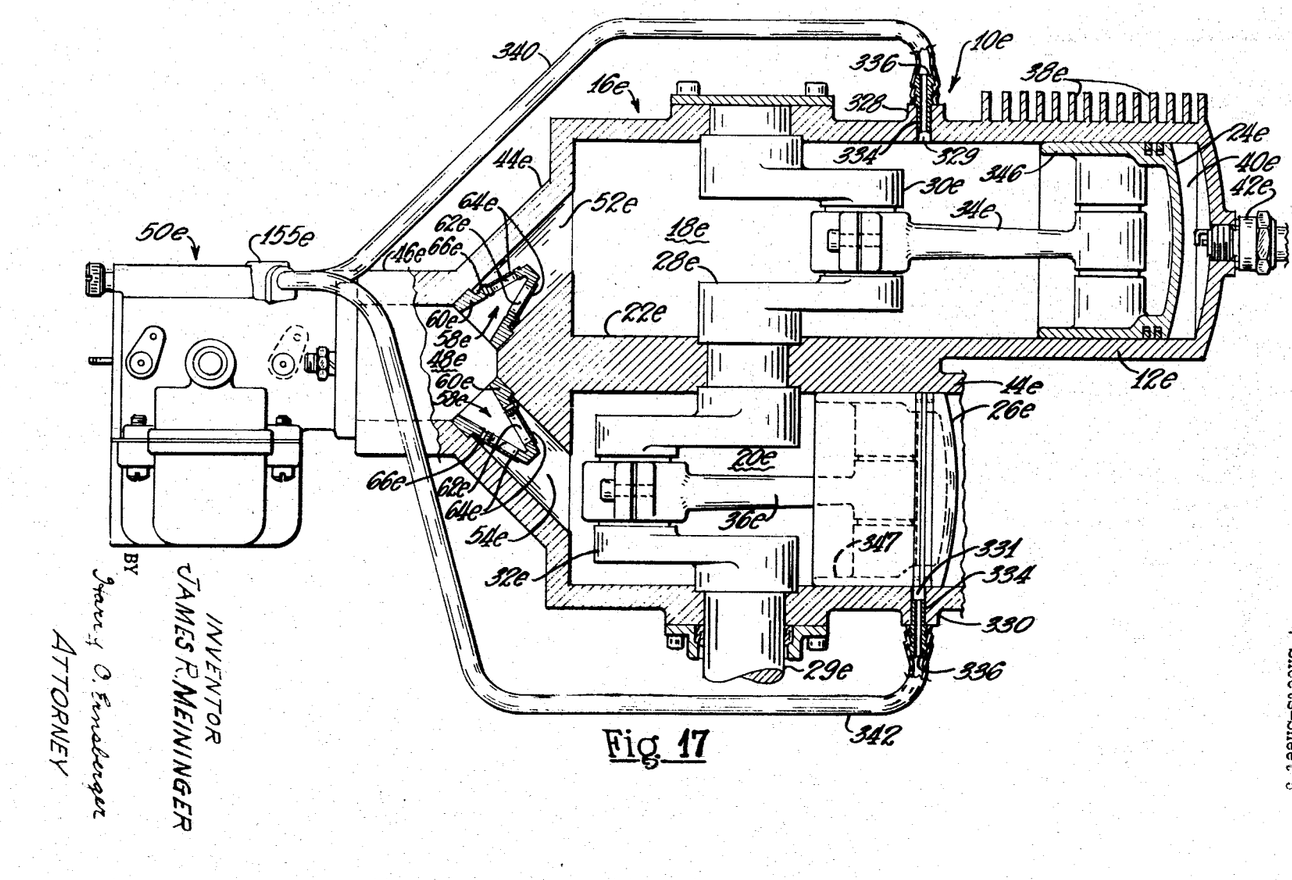
FIGURE 17 is a view similar to FIGURE 1 illustrating a system in which the engine idling fuel is delivered into a crankcase compartment through a port in the cylinder wall.
Figure 18:
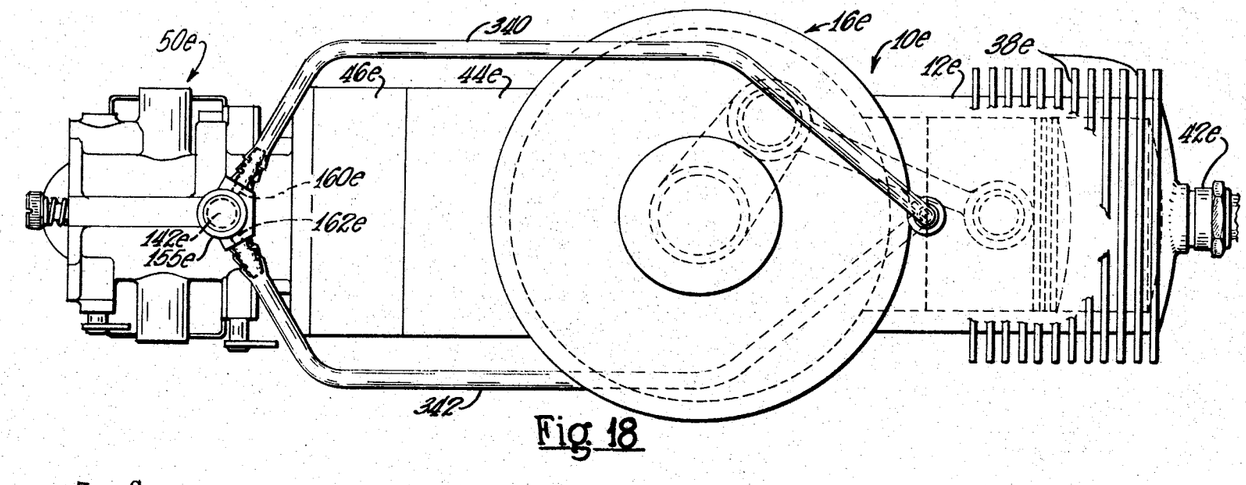
FIGURE 18 is a top plan view of the arrangement shown in FIGURE 17.

FIGURE 17 is a sectional view of a two cylinder, two cycle engine similar to the engine illustrated in FIGURES 1 and 6, a side view of the engine being illustrated in FIGURE 18. The engine 10e is of the two cylinder, two cycle type embodying two cylinders 12e and 14e which are connected or integrated with an engine crankcase 16e divided into two crankcase chambers or compartments 18e and 20e by a central wall 22e. Reciprocably mounted in the respective cylinders are pistons 24e and 26e of identical construction. Journaled in the crankcase 16e is a crankshaft 28e provided with a crank arm 30e in the crankcase chamber 18e and a second crank arm 32e in the crankcase chamber 20e.

The crank pin carried by the first crank arm 30e is connected with the wrist pin of the piston 24e by a conventional connecting rod 34e, and the pin carried by the second crank arm 32e connected by a connecting rod 36e with the wrist pin of the piston 26e.

The crank arms 30e and 32e are oppositely disposed or spaced 180° apart to attain a substantially balanced condition of the moving components of the engine. The crankshaft 28e is provided with a portion 29e extending exteriorly of the crankcase housing for connection with mechanism to be driven by the engine.

The cylinder walls are provided with cooling fins 38e, shown on the cylinder 12e, for dissipating heat during engine operation. The space 40e between each piston and the head of the cylinder provides a combustion chamber wherein mixture, delivered above the piston from a crankcase compartment through conventional channel means (not shown) is ignited at each revolution of the crankshaft by a conventional spark plug 42e.

The engine crankcase 16e is provided with a portion 44e and a manifold extension 46e, the latter providing a manifold chamber 48e which receives combustible fuel and air mixture from a charge forming device or carburetor 50e. The portion 44e of the crankcase construction is fashioned with a first passage 52e opening into the crankcase chamber 18e and a second passage 54e opening into the second crankcase chamber or compartment 20e, the passages 52e and 54e adapted to convey combustible fuel and air mixture from the manifold chamber 48e into the crank case compartments wherein the mixture is compressed upon downward movements of the piston and delivered through suitable channel means (not shown) to the combustion chambers 40e.

Each of the passages 52e and 54e is provided with a one-way valve construction which accommodates flow of fuel and air mixture from the manifold 48e into the crankcase compartments but inhibits reverse flow of gases from the crankcase chambers. In the embodiment illustrated in FIGURE 17, a one-way valve means 58e is disposed at the entrance of passage 52e and a similar or identical valve means 58e is disposed at the entrance of the passage 54e. Each of the valve means is inclusive of a fitting or member 60e having converging wall portions provided with ports 62e normally closed by reed valves 64e, one edge region of each reed valve being secured to member 60e by a rivet 66e.

The reeds 64e are of flexible metal and are opened under reduced pressure or partial vacuum in a crankcase compartment to admit fuel and air mixture from the manifold 48e. As the pistons move in opposed phase relation, mixture from the manifold 48e is alternately delivered into the engine crankcase compartments 18e and 20e. The carburetor 50e is of the construction shown in FIGURES 2 through 5A wherein air passing through a mixing passage aspirates fuel from a main orifice for supplying the engine with fuel mixture flowing through the manifold 48e and past the reed valves 64e for engine operation other than engine idling operations, the mixing passage in the carburetor being in registration with the manifold 48e.

FIGURES 17 and 18 illustrate a modified arrangement for delivering fuel for engine idling purposes into the crankcase compartments through tubular means independently of the normal fuel and air mixture delivered past the reed valves 64e. An exterior region of the cylinder wall 12e is fashioned with a boss 328 and the cylinder wall 14e fashioned with a similar boss 330. The bosses are provided respectively with bores 329 and 331 to receive tenon portions 334 of nipples or tubular members 336.

The carburetor 50e is fashioned with a boss portion 155e of the character shown in FIGURE 3, the boss portion 155e provided with a chamber 142e corresponding to the chamber 142 shown in FIGURE 5 which receives fuel for engine idling purposes from the fuel chamber in the carburetor mixed with air as described in connection with FIGURES 5 and 5A. The boss 155e is bored to accommodate nipples 160e and 162e as shown in FIGURE 18. A tube 340, which may be of copper or flexible synthetic rubber, connects the nipples 160e and 336, and a similar tube 342 connects nipples 162e and 336, as shown in FIGURES 17 and 18.

The arrangement of tubes and nipples is adapted to convey an emulsion of fuel from the supplemental chamber 142e in the carburetor into the respective crankcase compartments 18e and 20e upon establishment of reduced pressures in the crankcase compartments.

As particularly illustrated in FIGURE 17, the bores or ports 329 and 331 are disposed in the cylinder walls in positions whereby the ports are closed or valved by the piston skirts 346 and 347 of pistons 24e and 26e respectively during certain periods of reciprocation of the pistons in cylinders. The closing of the ports by the piston skirts perform the functions of the check valve constructions hereinbefore described and illustrated in FIGURES 8 through 16.

With particular reference to FIGURE 17, as the piston 26e moves in a right-hand direction, as viewed in FIGURE 17, the piston skirt 347 uncovers the port 331 in the boss 330. Upward movement of the piston 26e establishes reduced pressure or partial vacuum in the crankcase compartment 20e. This reduced pressure is transmitted through the port or bore 331 and tube 342 to the supplemental chamber 142e, aspirating an emulsion of fuel from the chamber 142e into the crankcase compartment 20e. When the piston 26e moves toward the head of the cylinder, the piston 24e moves in a left-hand direction and, after moving a short distance, the skirt 346 of the piston 24e covers the port 329.

Further movement of piston 24e in a left-hand direction compresses the fuel and air mixture in the crankcase compartment 18e and the compressed mixture delivered through channel means (not shown) into the combustion chamber adjacent the cylinder head.

During the periods of movement of the pistons in a right-hand direction with the ports uncovered, as viewed in FIGURE 17, the emulsion of fuel and air is alternately drawn into the crankcase compartments together with a restricted amount of air admitted to the manifold 48e through the openings 88 in the throttle valve of the carburetor, shown in FIGURE 5A, when the throttle valve is tightly closed in engine idling position.

The air admitted through the passages 88 flows through the manifold 48e and through the ports 62e past the reed valves 64e into the crankcase compartments when subatmospheric pressure is developed in the compartments by piston movements. Thus, in this form of the invention, the piston skirts 346 and 347 alternately close and open the ports 329 and 331 for the admission of an emulsion of fuel from the supplemental chamber 142e which mixes with the air in the crankcase flowing through the openings 88 in the closed throttle valve and past the reed valves 64e to form mixtures in the crankcase compartments of a character for providing idling operation of the engine.

Through this arrangement, each of the cylinders receives substantially the same amount of fuel and air so that there is no "puddling" of fuel in the crankcase compartments as each compartment receives a proper amount of fuel and air mixture for proper engine idling operation.

In this arrangement, the sleeves or skirts 346 and 347 of the pistons 24e and 26e provide the valve means for closing the ports 329 and 331 upon movement of the pistons in a left-hand direction to compress the charges of fuel and air mixture admitted under the influence of aspiration through the port, the piston skirts closing the ports to prevent reverse flow of fuel and air emulsion in the tubes 340 and 342 when the mixtures are being compressed in the crankcase compartment 18e and 20e.

The same series of actions occurs in connection with the movement of the piston 26e in the cylinder 14e but phased 180 degrees from the actions occurring in connection with the movements of piston 24e. The positions of the ports 329 and 331 in relation to the stroke of the pistons are such as to secure most efficient operation. The ports should be positioned with respect to the movements of the pistons whereby the end of a piston skirt should cover or close the port upon the start of compression pressure built up in the crankcase compartment during the period that a piston is moving toward the crankshaft and compressing the mixture in the crankcase compartment for subsequent delivery into the combustion chamber above the piston.

The port should be opened or uncovered during movement of a piston toward the cylinder head so that the partial vacuum or reduced pressure in the crankcase compartment is effective to aspirate fuel and air emulsion through a port 329 or 331 for a sufficient period of time to admit sufficient fuel and air emulsion for mixing with air passing the reed valves 64e to provide a proper engine idling mixture.

Figure 19:
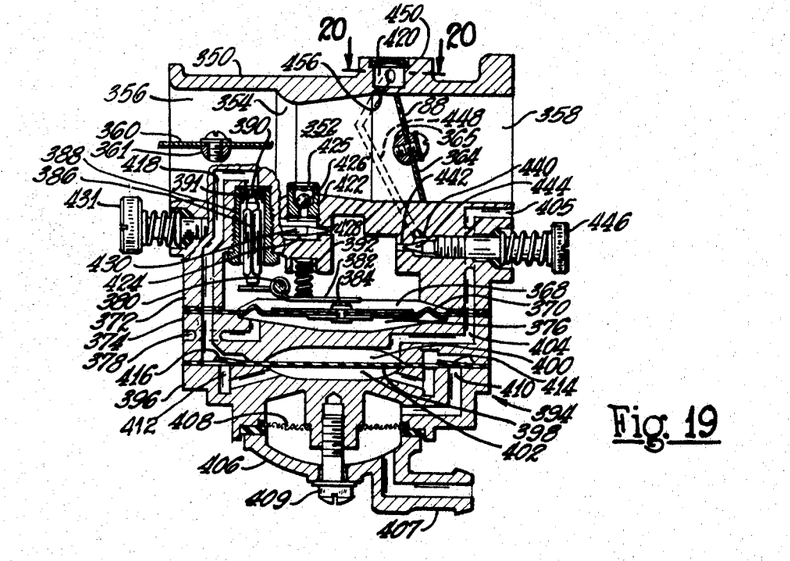
FIGURE 19 is a vertical sectional view of a diaphragm type carburetor for supplying engine idling fuel for delivery to the engine independently of the mixing passage of the carburetor.

The method and arrangements for supplying engine idling mixtures to a multicylinder two cycle engine independently of the normal engine operating mixture may be provided through a charge forming apparatus or device of the so-called diaphragm type. FIGURE 19 illustrates a diaphragm type carburetor and diaphragm fuel pump of a character adaptable for delivering fuel and air mixture for normal and high speed engine operation and for delivering a fuel and air emulsion to engine crankcase compartments to provide proper mixtures for engine idling operation.

The diaphragm carburetor and diaphragm fuel pump construction shown in FIGURE 19 is of the general character of the arrangement disclosed in Phillips Patent 3,085,791. The construction shown in FIGURE 19 is inclusive of a carburetor body 350 having a mixing passage 352 embodying a Venturi 345, an air inlet region 356 and a mixture outlet region 358. A choke valve 360 mounted upon a rotatable shaft 361 is disposed in the air inlet region 356 for engine starting purposes. A disc type throttle valve 364 is mounted on a rotatable shaft 365 for regulating flow of fuel and air mixture to the crankcase compartments for normal and high speed operation.

In engine idling position, the throttle valve 364 is tightly closed as shown in FIGURE 19. The throttle disc 364 is fashioned with a plurality of openings 88' of the character shown in FIGURE 5A for supplying air to the crankcase compartments for admixing with the fuel and air emulsion delivered to the crankcase compartments independently of the mixing passage in the carburetor for engine idling purposes.

The carburetor body is fashioned with a fuel chamber 368, one wall of which is provided by a flexible diaphragm 370 disposed between a circular boss 372 of the carburetor body and a member 374.

The member 374 is fashioned with a recess 376 vented to the atmosphere through a vent 378 to facilitate flexing movements of the diaphragm 370. Fulcrumed upon a pin 380 is a lever 382, the long arm of the lever being adapted to be engaged by a headed member 384 carried by the diaphragm 370, the short arm of the lever engaging an inlet valve body 386 slidably disposed within a fitting 388 in the carburetor body. The valve body 386 has a conically-shaped or needle valve portion 390 for cooperation with an annular valve seat 391 for controlling flow of liquid fuel into the fuel chamber 368.

A coil spring 392 normally biases the lever 382 in a clockwise direction to urge the inlet valve 390 to closed position. Fuel flow into the fuel chamber 368 is under the influence of engine aspiration existent in the mixing passage 352. In the embodiment illustrated in FIGURE 19, fuel is supplied to the region of the inlet valve by a diaphragm fuel pump construction 394. The pump construction is of the general character shown in Phillips Patent 2,979,312. The fuel pump construction includes the first member 374 and a second member 396, a flexible pumping diaphragm 398 being disposed between the members.

Member 374 is fashioned with a cavity 400 providing a pumping chamber and member 396 has a similar cavity 402 forming a fuel receiving chamber. The pumping diaphragm 400 is connected by channels 404 and 405 with a port (not shown) in one of the engine crankcase compartments whereby varying fluid pressure in the engine crankcase compartment developed by piston movement establishes varying fluid pressures or pulsations in the pumping chamber 400 to vibrate the pumping diaphragm 398.

Secured to the member 396 is a third member 406 having a nipple portion adapted to be connected by a flexible tube (not shown) with a fuel supply tank. A filter 408 is disposed between members 396 and 406, member 406 being secured in position by a screw 409. The member 396 is fashioned with fuel passages including an inlet port 410 and an outlet port 412. Flap valves 414 and 416, formed as integral portions of the diaphragm 398, cooperate with the ports 410 and 412 respectively to facilitate fuel flow from the supply through the fuel chamber 402 and through a passage 418 to the region of the fuel inlet valve 390 in the carburetor.

The carburetor is provided with fuel passages and manually adjustable valve means for regulating fuel delivery into the mixing passage 352 and into the supplemental chamber 420 which is similar to the chamber 142 shown in FIGURE 5.

The carburetor body 350 is fashioned with a bore in which is disposed a fitting 422 in communication with a bore 424, the fitting opening into the Venturi 354 and providing the main fuel delivery orifice 425 for normal and high speed engine operation. A check ball 426 is disposed in the fitting 422 to prevent air back bleeding into the fuel passage system for engine idling.

A restricted passage 428 opens into the chamber 368 and fuel for delivery through the main orifice is controlled by a manually adjustable needle valve 430. By adjusting the needle valve 430 by manipulating the knurled head 431, fuel delivery through the main orifice 425 may be regulated or controlled. The carburetor body is provided with a bore 440 in communication with the fuel chamber 368 by a restricted passage 442. The bore 440 is in communication with the supplemental chamber 420 by a fuel passage 448. A manually adjustable needle valve 444 cooperates with the restriction 442 for regulating and controlling fuel flow to the supplemental chamber 420 providing the engine idling fuel.

Figure 20:
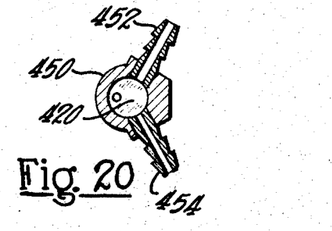
FIGURE 20 is a fragmentary sectional view taken on the line 20—20 of FIGURE 19.

The needle valve 444 is adjusted by manipulation of the knurled head 446. As shown in FIGURE 20, the portion 450 of the carburetor is fashioned with the supplemental chamber 420, the portion 450 being provided with bores to snugly receive nipples 452 and 454 similar to the construction shown in FIGURE 3. The nipples 452 and 454 are adapted to be connected by means of tubes with the crankcase compartments in the manner shown in FIGURE 17, the nipples being of conventional construction without check valves.

Where the carburetor shown in FIGURE 19 is used with the engine construction illustrated in FIGURES 1 or 6, the nipples 452 and 454 may be replaced with any of the forms of the nipples embodying check valves shown in FIGURES 8 through 16 to prevent reverse flow of engine idling mixture during crankcase compression strokes of the pistons. As shown in FIGURE 19, a low speed orifice 456 opens into the mixing passage from the supplemental chamber 420 which orifice is adapted to deliver fuel into the mixing passage when the throttle valve 364 is partially opened for low speed engine operation.

When the valve 364 is in closed or engine idling position, air from the mixing passage flows through the orifice 456 into the chamber 420 and there mixed with fuel from the passage 448 whereby an emulsion of fuel and air is delivered through the nipples and tubes to the engine crankcase compartments for engine idling operations. The carburetor and fuel pump arrangement shown in FIGURE 19 enables operation of the engine in any position because the delivery of fuel into the carburetor chamber 368 and into the mixing passage and engine idling system is under the influence of engine aspiration.

It is to be understood in all forms of the idle fuel conveying system that in lieu of the openings 88 in the throttle valve 87 for admitting air for the idle mixture in the crankcase compartments, the openings may be omitted and the throttle valve 87 adjusted in engine idling position so that it is slightly open a sufficient amount to admit air from the mixing passage for the engine idling mixture in the crankcase compartments.

Thus engine aspiration is effective to control the position of the metering diaphragm 370 to move the lever 382 and open the valve 390 to admit fuel only as required by engine operation into the mixing passage 352 or into the independent engine idling system as described.

It is apparent that, within the scope of the invention, modifications and different arrangements may be made other than as herein disclosed, and the present disclosure is illustrative merely, the invention comprehending all variations thereof.

I claim:

1. A fuel feed system for an internal combustion engine of the two-cylinder reciprocating-piston type having two crankcase chambers arranged to receive combustible mixture including, in combination, a carburetor provided with a mixing passage and a fuel chamber, orifice means in the carburetor for delivering fuel from the chamber into the mixing passage, a first pair of ports establishing communication between each crankcase chamber and the mixing passage to deliver fuel and air mixture from the mixing passage into the crankcase chambers, check valve means for each of the first pair of ports for preventing reverse flow of mixture to the carburetor, a second pair of ports, each of said second ports being in a cylinder wall of each cylinder in communication with the crankcase chambers, channel means independent of said mixing passage for conveying fuel from the fuel chamber in the carburetor to each of the second ports, said second ports being disposed whereby the reciprocating pistons cover and uncover said second ports for controlling delivery of fuel therethrough into the engine crankcase chambers for engine idling purposes.

2. A fuel feed system for an internal combustion engine of the two-cylinder reciprocating-piston type having two crankcase chambers wherein combustible mixture is delivered into the crankcase chambers including, in combination, a carburetor provided with a mixing passage and a fuel chamber, orifice means for delivering fuel from the carburetor fuel chamber into the mixing passage, a manifold in communication with the mixing passage, a pair of primary ports in communication with the manifold for conveying fuel and air mixture from the carburetor mixing passage into the crankcase chambers, valve means associated with said primary ports for controlling delivery of mixture from the mixing passage into the crankcase chambers, a secondary port in the wall of each of the cylinders of the engine, a supplemental chamber in the carburetor, fuel channel means in the carburetor for conveying fuel from the fuel chamber in the carburetor to the supplemental chamber, passage means connecting the supplemental chamber with each of the secondary ports, said secondary ports being disposed whereby the reciprocating pistons cover and uncover the secondary ports for controlling delivery of fuel through the ports into the crankcase chambers independently of the mixing passage for engine idling purposes.

References Cited

UNITED STATES PATENTS

| | | |
|---|---|---|
| 1,624,024 | 4/1927 | Svensson et al. |
| 1,760,737 | 5/1930 | Boden. |
| 1,817,127 | 8/1931 | Crockett. |
| 2,639,699 | 5/1953 | Kiekhaefer. |
| 2,759,716 | 8/1956 | Jones. |
| 3,361,120 | 1/1968 | Schneider. |

WENDELL E. BURNS, Primary Examiner.

U.S. Cl. X.R.

123—52, 59, 74